Figure 1:
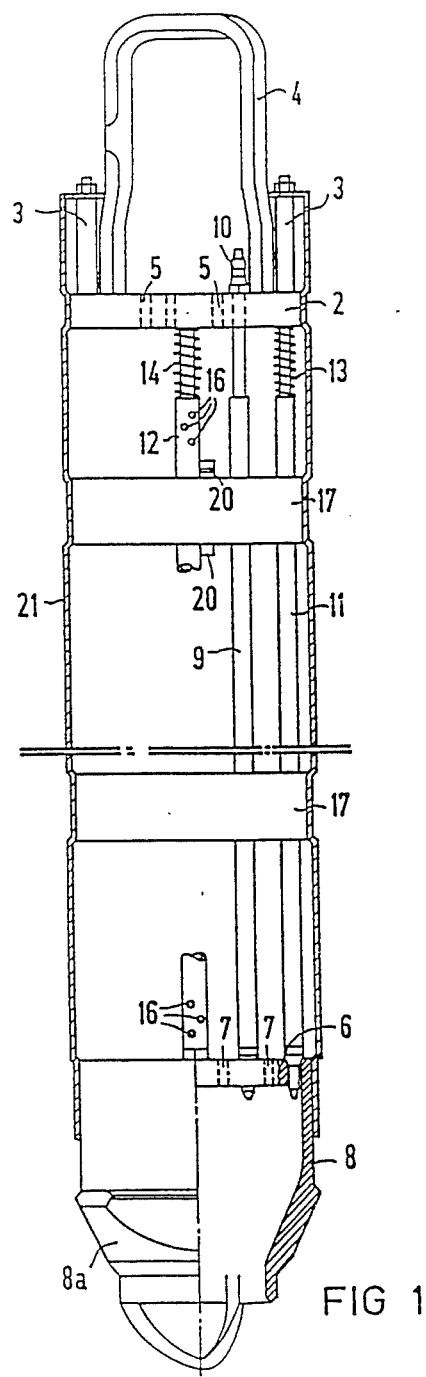

United States Patent [19]

Garzarolli et al.

[11] Patent Number: 4,938,920
[45] Date of Patent: Jul. 3, 1990

[54] NUCLEAR REACTOR FUEL ASSEMBLY

[75] Inventors: Friedrich Garzarolli, Hoechstadt-Aisch; Erhard Ortlieb, Kalchreuth; Eckard Steinberg, Erlangen; Hans Weidinger, Nuremberg, all of Fed. Rep. of Germany

[73] Assignee: Siemens Aktiengesellschaft, Munich, Fed. Rep. of Germany

[21] Appl. No.: 216,829

[22] Filed: Jul. 8, 1988

[30] Foreign Application Priority Data

Feb. 18, 1988 [DE] Fed. Rep. of Germany ....... 3805124

[51] Int. Cl.$^5$ .............................................. B21C 3/06
[52] U.S. Cl. ..................................... 376/457; 376/900; 420/422
[58] Field of Search ................. 376/457, 900; 420/422

[56] References Cited

U.S. PATENT DOCUMENTS

| 4,212,686 | 7/1980 | Lunde et al. | 148/11.5 F |
| 4,717,534 | 1/1988 | Morita | 376/419 |
| 4,735,768 | 4/1988 | Stehle | 376/417 |

FOREIGN PATENT DOCUMENTS 0212351 3/1987 European Pat. Off. .
2602368 2/1988 France .

Primary Examiner—Donald P. Walsh
Attorney, Agent, or Firm—Herbert L. Lerner; Laurence A. Greenberg

[57] ABSTRACT

A nuclear reactor fuel assembly includes a fuel rod containing nuclear fuel in a cladding tube formed of an iron-containing zirconium alloy. A fuel assembly skeleton to which the fuel rod is attached has a structural part formed of the iron-containing zirconium alloy. The iron-containing zirconium alloy has an oxygen content of from 0.1 to 0.16% by weight and contains alloy components of from 0 to 1% by weight of niobium, 0 to 0.8% by weight of tin, at least two metals from the group consisting of iron, chromium and vanadium having from 0.2 to 0.8% by weight of iron, 0 to 0.4% by weight of chromium and 0 to 0.3% by weight of vanadium, a total percent by weight of iron, chromium and vanadium of from 0.25 to 1% by weight, and a total percent by weight for niobium and tin in the range from 0 to 1% by weight.

19 Claims, 2 Drawing Sheets

NUCLEAR REACTOR FUEL ASSEMBLY

The invention relates to a nuclear reactor fuel assembly including a fuel rod containing nuclear fuel in a cladding tube formed of an iron-containing zirconium alloy with au oxygen content of from 0.1 to 0.16% by weight and/or including a fuel assembly skeleton to which the fuel rod is attached having a structural part which is also formed of the iron-containing zirconium alloy having an oxygen content of from 0.1 to 0.16% by weight, especially a grid-like spacer having openings formed therein, the fuel rod being guided through one of the openings, a water rod parallel to the fuel rod being guided in one of the openings, and an end plug closing the fuel rod, or a fuel channel in which the spacer and fuel rod or water rod is disposed.

A nuclear reactor fuel assembly of this type is conventional. The cladding tube and structural parts may be formed of a zirconium alloy containing iron, which is known by the trademark Zircaloy 4. This zirconium alloy known as Zircaloy 4 includes not only zirconium but also further alloy components of from 1.2 to 1.7% by weight of tin, 0.18 to 0.24% by weight of iron, 0.07 to 0.13% by weight of chromium and 0.10 to 0.16% by weight of oxygen, with the total percent by weight for the components of iron and chromium being in the range from 0.28 to 0.37% by weight. The fuel assembly is used in nuclear reactors, in which it is cooled with light water, for instance. In these nuclear reactors, the zirconium alloy of the cladding tube and structural parts has a relatively small capture cross section for thermal neutrons.

During operation in the nuclear reactor, corrosion occurs on the outside of the cladding tube and structural parts, which limits the time period in which the fuel assembly can be used in the nuclear reactor. Typical service lives are from 3 to 4 years.

It is accordingly an object of the invention to provide a nuclear reactor fuel assembly, which overcomes the hereinafore-mentioned disadvantages of the heretofore-known devices of this general type, which lengthens the service life of the fuel assembly in a nuclear reactor and which improves the corrosion resistance of the iron-zirconium alloy from which the cladding tube and structural parts are made, while making as little sacrifice as possible in terms of the strength of the zirconium alloy.

With the foregoing and other objects in view there is provided, in accordance with the invention, a nuclear reactor fuel assembly including a fuel rod containing nuclear fuel in a cladding tube formed of an iron-containing zirconium alloy with an oxygen content of from 0.1 to 0.16% by weight and/or including a fuel assembly skeleton to which the fuel rod is attached having a structural part which is also formed of the iron-containing zirconium alloy having an oxygen content of from 0.1 to 0.16% by weight, especially a grid-like spacer having openings formed therein, the fuel rod being guided through one of the openings, a water rod parallel to the fuel rod being guided in one of the openings, and an end plug closing the fuel rod, or a fuel channel in which the spacer and fuel rod or water rod is disposed, the iron-containing zirconium alloy having an oxygen content of from 0.1 to 0.16% by weight and containing alloy components of from 0 to 1% by weight of niobium, 0 to 0.8% by weight of tin, at least two metals from the group consisting of iron, chromium and vanadium having from 0.2 to 0.8% by weight of iron, 0 to 0.4% by weight of chromium and 0 to 0.3% by weight of vanadium, a total percent by weight of iron, chromium and vanadium of from 0.25 to 1% by weight, and a total percent by weight for niobium and tin in the range from 0 to 1% by weight.

The invention is based on the recognition that the corrosion resistance of the iron-containing zirconium alloy of the nuclear reactor fuel element improves as the tin content thereof becomes lower. Tin may even be completely absent as an alloy component if vanadium and/or niobium is contained instead in the zirconium alloy.

In accordance with another feature of the invention, the alloy components of the iron-containing zirconium alloy contain from 0 to 0.6% by weight of tin, 0 to 0.5% by weight of niobium, 0.2 to 0.8% by weight of iron and 0.05 to 0.4% by weight of chromium, and the total percent by weight for niobium and tin is in the range from 0.2 to 0.8% by weight.

In accordance with a further feature of the invention, the alloy components of the iron-containing zirconium alloy contain from 0.2 to 0.8% by weight of iron and 0.1 to 0.3% by weight of vanadium, and the total percent by weight for niobium and tin is 0.

In accordance with an added feature of the invention, the iron-containing zirconium alloy contains from 0 to 0.6% by weight of tin, 0 to 1% by weight of niobium, 0.2 to 0.8% by weight of iron and 0.1 to 0.3% by weight of vanadium, and the total percent by weight for niobium and tin is in the range from 0.2 to 1% by weight.

These features of the nuclear reactor fuel assembly further improve the corrosion resistance of the cladding tube and structural parts.

In accordance with a concomitant feature of the invention, the iron-containing zirconium alloy has a nickel content of at most 70 ppm. The low nickel content prevents the zirconium alloy from becoming brittle as a result of excessive absorption of water during operation in the water-cooled nuclear reactor.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
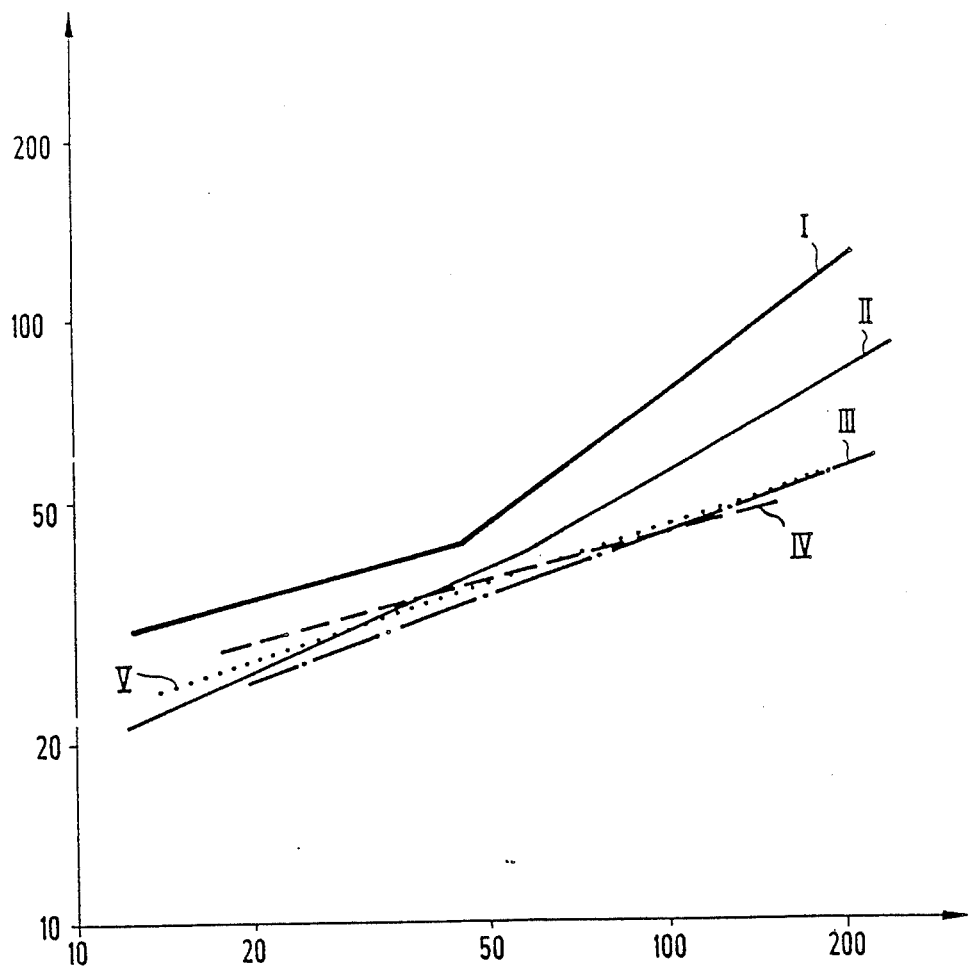

FIG. 1 is a diagrammatic, partially longitudinal-sectional, side-elevational view of a nuclear reactor fuel assembly for a boiling water reactor: and FIG. 2 is a diagram showing the increase in weight over time for test bodies.

Referring now to the figures of the drawings in detail and first, particularly, to FIG. 1 thereof, there is seen a nuclear reactor fuel assembly for a boiling water reactor, which is selected solely as an example. The skeleton of the nuclear reactor fuel assembly has a fuel assembly head with a square grid plate 2, which is provided with two stay bolts 3 and a handle 4 on the top thereof. The grid plate 2 is provided with multiple flow ducts 5 in the longitudinal direction of the fuel assembly, which are indicated by broken lines and through which a coolant flows in the reactor core of a boiling water reactor. The grid plate 2 is disposed at right angles to the longitudinal direction of the fuel assembly.

The fuel assembly skeleton also has a fuel assembly base, which also has a square grid plate 6 disposed at right angles to the longitudinal direction of the fuel assembly. The square grid plate 6 also has a multiplicity of flow ducts 7 in the longitudinal direction of the fuel assembly which are indicated by broken lines, for the coolant in the reactor core of a boiling water reactor. The lower surface of the grid plate 6 of the fuel assembly base is provided with an adaptor 8 that is open toward the grid plate 6 and is inserted vertically from above into an opening of a so-called core-grid located in the reactor core of the boiling water reactor.

The fuel assembly skeleton further includes a central water rod 12 having ends loosely inserted into ducts in the grid plates 2 and 6 of the fuel assembly head and base. A holding-down spring 14 in the form of a helical spring, which is a compression spring, is mounted at the upper end of the water rod 12 and is supported on the water rod 12 at one end and on the lower surface of the grid plate 2 of the fuel assembly head at the other end.

The fuel assembly skeleton furthermore has a plurality of spacers 17 between the head and base of the fuel assembly, which are spaced apart from one another and from the head and base of the fuel assembly, in the longitudinal direction of the fuel assembly. The spacers 17 are square, are aligned with the grid plate 2 of the fuel assembly head and the grid plate 6 of the fuel assembly base, and are formed of a grid of upright sheet-metal ribs intersecting one another at right angles. The water rod 12 is disposed in one of the openings of the spacers 17. Each of the spacers 17 is positioned between two mutually aligned fins 20 on the outside of the jacket or shell surface of the water rod 12 which are spaced apart from one another at a suitable spacing in the longitudinal direction of the water rod 12 and therefore in the longitudinal direction of the fuel assembly as well.

Another element of the fuel assembly skeleton is a duct tube or cladding case 21 with a square cross section, which is a so-called fuel channel or assembly case, that is mounted on the outside on the fuel assembly head, on the spacers 17 and on the fuel assembly base and which envelops the water rod 12, forming a flow channel for the coolant in the reactor core of a boiling water reactor.

The structural parts of the fuel assembly skeleton, which are formed of an iron-containing zirconium alloy as defined above by the features of the invention, are the grid-like spacers 17, the fuel channel 21 and the central water rod 12. The central water rod 12 is a tube that is closed at both ends. Radial flow apertures 16 for liquid water are provided in the jacket or shell of the tube at the ends of the water rod 12.

In the case of a nuclear reactor fuel assembly for a pressurized water reactor having fuel rods in grid-like spacers as structural parts, this tube may be open at both ends and disposed off-center and it may be provided as a guide tube for a control rod. As a rule, a fuel assembly of this kind for a pressurized water reactor does not have a fuel channel.

Disposed on the fuel assembly skeleton is a row of fuel rods 9 filled with nuclear fuel, which are screwed into the grid plate 6 of the fuel assembly base and extend through the grid plate 2 of the fuel assembly head, where they are screwed to the grid plate 2 with a nut 10 located on the surface of the grid plate 2. The fuel rods 9 serve as so-called retaining rods for the head and the base of the nuclear reactor fuel assembly.

Further fuel rods 11 filled with nuclear fuel have ends which are loosely inserted into ducts in the grid plates 2 and 6 of the fuel assembly head and base. As in the case of the water rod 12, holding-down springs 13, which are compression springs and are constructed as helical springs, are mounted on the upper ends of the further fuel rods 11 and are each supported at one end on a fuel assembly rod 11 and at the other end on the lower surface of the grid plate 2 of the fuel assembly head.

Each of the fuel rods 9 and 11 is guided through a separate opening in the spacers 17, which have rigid bearing lobes and a bearing spring facing one another in the openings, with which the respective fuel rod 9 or 11 is retained in a force-locking manner in the associated opening. A force-locking connection is one which is connects two elements together by force external to the elements, as opposed to a form-locking connection which is provided by the shapes of the elements themselves.

Each of the fuel rods 9 and 11 also has a cladding tube of iron-containing zirconium alloy as defined by the features of the invention given above. Nuclear fuel is located in the cladding tube, which is closed at both ends with an end plug. The end plug may also be formed of iron-containing zirconium alloy as defined by the features of the invention given above.

In the diagram of FIG. 2 of the drawing, the increase in weight in milligrams per square decimeter ($mg/dm^2$) for five test bodies in water vapor at 400° C., is plotted on the ordinate in logarithmic graduations against a test duration in days on the abscissa, which is also in logarithmic graduations. A first sample body I was formed of Zircaloy 4.

A second sample body II was formed of a zirconium alloy having 0.8% by weight of tin, 0.22% by weight of iron, 0.11% by weight of chromium, 0.14% by weight of oxygen and 25 ppm of nickel as alloy components. A third sample body 111 was formed of a zirconium alloy with 0.4% by weight of niobium, 0.67% by weight of iron, 0.33% by weight of chromium, 0.15% by weight of oxygen and 35 ppm of nickel as alloy components. A fourth sample body IV was formed of a zirconium alloy having 0.75% by weight of iron, 0.25% by weight of vanadium, 0.1% by weight of oxygen and less than 50 ppm of nickel as alloy components. A fifth sample body V was formed of a zirconium alloy having 0.25% by weight of tin, 0.2% by weight of iron and 0.15% by weight of vanadium as well as 0.1% by weight of oxygen and less than 50 ppm of nickel as alloy components.

The diagram of FIG. 2 shows that an acceleration of corrosion took place within a test period of 200 days only in the sample bodies I and II, although to a lesser extent in the sample body II, while the sample bodies III–V exhibited no acceleration of corrosion whatsoever within this test period.

The corrosion speed of the sample bodies II–V after 200 days was at most 60% of the corrosion speed of the sample body I of Zircaloy 4. The strength of the sample bodies II–V was approximately equal to the strength of the sample body I.

According to the invention, the service life of a nuclear reactor fuel assembly in a nuclear reactor can accordingly be least 30% longer than that of a nuclear reactor fuel assembly in which the cladding rubes of the fuel rods and structural parts of the fuel assembly skeleton are manufactured from Zircaloy 4.

We claim:

1. Nuclear reactor fuel assembly, comprising a fuel rod containing nuclear fuel in a cladding tube formed of an iron-containing zirconium alloy, and a fuel assembly skeleton to which said fuel rod is attached having a structural part formed of said iron-containing zirconium alloy, said iron-containing zirconium alloy having an oxygen content of from 0.1 to 0.16% by weight and containing alloy components of from 0 to 0.8% by weight of tin, at least two metals from the group consisting of iron, chromium and vanadium having from 0.2 to 0.8% by weight of iron, 0 to 0.4% by weight of chromium and 0 to 0.3% by weight of vanadium, and a total percent by weight of iron, chromium and vanadium of from 0.25 to 1% by weight.

2. Nuclear reactor fuel assembly according to claim 1, wherein said fuel assembly skeleton includes a grid-like spacer having openings formed therein, said fuel rod being guided in one of said openings, a water rod parallel to said fuel rod being guided in one of said openings, an end plug closing said fuel rod, and a fuel channel in which said spacer, said fuel rod and said water rod are disposed.

3. Nuclear reactor fuel assembly according to claim 1, wherein said fuel assembly skeleton includes a grid-like spacer having openings formed therein, said fuel rod being guided in one of said openings, and a water rod parallel to said fuel rod being guided in one of said openings.

4. Nuclear reactor fuel assembly according to claim 1, wherein said alloy components of said iron-containing zirconium alloy contain from 0.2 to 0.6% by weight of tin, 0.2 to 0.8% by weight of iron and 0.05 to 0.4% by weight of chromium.

5. Nuclear reactor fuel assembly according to claim, 1, wherein said alloy components of said iron-containing zirconium alloy contain from 0.2 to 0.8% by weight of iron and 0.1 to 0.3% by weight of vanadium, and the percent by weight for tin if 0.

6. Nuclear reactor fuel assembly according to claim 1, wherein said iron-containing zirconium alloy contains from 0.2 to 0.6% by weight of tin, 0.2 to 0.8% by weight of iron and 0.1 to 0.3% by weight of vanadium.

7. Nuclear reactor fuel assembly according to claim 1, wherein said iron-containing zirconium alloy has a nickel content of at most 70 ppm.

8. Nuclear reactor fuel assembly, comprising a fuel rod containing nuclear fuel in a cladding tube formed of an iron-containing zirconium alloy, said iron-containing zirconium alloy having an oxygen content of from 0.1 to 0.16% by weight and containing alloy components of from 0 to 0.8% by weight of tin, at least two metals from the group consisting of iron, chromium and vanadium having from 0.2 to 0.8% by weight of iron, 0 to 0.4% by weight of chromium and 0 to 0.3% by weight of vanadium, and a total percent by weight of iron, chromium, and vanadium of from 0.25 to 1% by weight.

9. Nuclear reactor fuel assembly according to claim 8, wherein said alloy components of said iron-containing zirconium alloy contain from 0.2 to 0.6% by weight of tin, 0.2 to 0.8% by weight of iron and 0.05 to 0.4% by weight of chromium.

10. Nuclear reactor fuel assembly according to claim 8, wherein said alloy components of said iron-containing zirconium alloy contain from 0.2 to 0.8% by weight of iron and 0.1 to 0.3% by weight of vanadium, and the percent by weight for tin is 0.

11. Nuclear reactor fuel assembly according to claim 8, wherein said iron-containing zirconium alloy contains from 0.2 to 0.6% by weight of tin, 0.2 to 0.8% by weight of iron and 0.1 to 0.3% by weight of vanadium.

12. Nuclear reactor fuel assembly according to claim 8, wherein said iron-containing zirconium alloy has a nickel content of at most 70 ppm.

13. Nuclear reactor fuel assembly, comprising a fuel rod containing nuclear fuel, and a fuel assembly skeleton to which the fuel rod is attached having a structural part formed of an iron-containing zirconium alloy, said iron-containing zirconium alloy having an oxygen content of from 0.1 to 0.16% by weight and containing alloy components of from 0 to 0.8% by weight of tin, at least two metals from the group consisting of iron, chromium and vanadium having from 0.2 to 0.8% by weight of iron, 0 to 0.4% by weight of chromium and 0 to 0.3% by weight of vanadium, and a total percent by weight of iron, chromium and vanadium of from 0.25 to 1% by weight.

14. Nuclear reactor fuel assembly according to claim 13, wherein said fuel assembly skeleton includes a grid-like spacer having openings formed therein, said fuel rod being guided in one of said openings, a water rod parallel to said fuel rod being disposed in one of said openings, an end plug closing said fuel rod, and a fuel channel in which said spacer, said fuel rod and said water rod are disposed.

15. Nuclear reactor fuel assembly according to claim 13, wherein said fuel assembly skeleton includes a grid-like spacer having openings formed therein, said fuel rod being guided in one of said openings, and a water rod parallel to said fuel rod being guided in one of said openings.

16. Nuclear reactor fuel assembly according to claim 13, wherein said alloy components of said iron-containing zirconium alloy contain from 0.2 to 0.6% by weight of tin, 0.2 to 0.8% by weight of iron and 0.05 to 0.4% by weight of chromium.

17. Nuclear reactor fuel assembly according to claim 13, wherein said alloy components of said iron-containing zirconium alloy contain from 0.2 to 0.8% by weight of iron and 0.1 to 0.3% by weight of vanadium, and the percent by weight for tin is 0.

18. Nuclear reactor fuel assembly according to claim 13, wherein said iron-containing zirconium alloy contains from 0.2 to 0.6% by weight of tin, 0 to 1% by weight of niobium, 0.2 to 0.8% by weight of iron and 0.1 to 0.3% by weight of vanadium.

19. Nuclear reactor fuel assembly according to claim 13, wherein said iron-containing zirconium alloy has a nickel content of at most 70 ppm.

* * * * *